(12) United States Patent
Baba et al.

(10) Patent No.: US 8,372,544 B2
(45) Date of Patent: Feb. 12, 2013

(54) NON-AQUEOUS ELECTROLYTE SECONDARY BATTERY

(75) Inventors: Yasunori Baba, Moriguchi (JP); Naoki Imachi, Moriguchi (JP); Takeshi Ogasawara, Moriguchi (JP)

(73) Assignee: Sanyo Electric Co., Ltd.

( * ) Notice: Subject to any disclaimer, the term of this patent is extended or adjusted under 35 U.S.C. 154(b) by 844 days.

(21) Appl. No.: 12/078,204

(22) Filed: Mar. 28, 2008

(65) Prior Publication Data

US 2008/0274410 A1 Nov. 6, 2008

(30) Foreign Application Priority Data

Mar. 28, 2007 (JP) ................................. 2007-083760

(51) Int. Cl.
*H01M 2/16* (2006.01)
(52) U.S. Cl. ........................................ 429/251; 429/246
(58) Field of Classification Search .................... 429/251
See application file for complete search history.

(56) References Cited

U.S. PATENT DOCUMENTS

| | | | | |
|---|---|---|---|---|
| 6,949,315 B1 * | 9/2005 | Samii et al. | ................... | 429/251 |
| 2003/0224242 A1 * | 12/2003 | Kaito et al. | ..................... | 429/94 |
| 2005/0214637 A1 * | 9/2005 | Imachi et al. | ................. | 429/144 |

FOREIGN PATENT DOCUMENTS

| JP | 10-50287 A | | 2/1998 |
|---|---|---|---|
| JP | 10050287 A | * | 2/1998 |

* cited by examiner

*Primary Examiner* — Ula C Ruddock
*Assistant Examiner* — Daniel Gatewood
(74) *Attorney, Agent, or Firm* — McDermott Will & Emery LLP (57) ABSTRACT

A non-aqueous electrolyte secondary battery is provided that remarkably improves battery reliability by quickly lowering the potential of the positive electrode while preventing separator shrinkage at high temperatures. A separator has on its surface a shrinkage-prevention-layer formed portion (3*a*), in which a layer for preventing separator shrinkage is formed, and a shrinkage-prevention-layer unformed portion (3*b*), in which the layer for preventing separator shrinkage is not formed. A positive electrode current collector and a negative electrode current collector respectively have a positive electrode current collector exposed portion (1*b*) and a negative electrode current collector exposed portion (2*b*). The shrinkage-prevention-layer unformed portion (3*b*) of the separator is disposed at a region where the current collector exposed portions (1*b*, 2*b*) face each other.

8 Claims, 4 Drawing Sheets

NON-AQUEOUS ELECTROLYTE SECONDARY BATTERY

BACKGROUND OF THE INVENTION

1. Field of the Invention

The present invention relates to improvements in lithium-ion batteries or non-aqueous electrolyte secondary batteries such as polymer batteries. More specifically, the invention relates to a battery structure that is capable of stabilizing a non-aqueous electrolyte secondary battery quickly even when the non-aqueous electrolyte secondary battery develops an abnormal condition for some reason, whereby high reliability can be achieved even with a high capacity, high power battery construction.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, non-aqueous electrolyte batteries that perform charge and discharge by transferring lithium ions between the positive and negative electrodes have been widely used as the driving power source for the mobile information terminal devices. However, the non-aqueous electrolyte batteries have not yet sufficiently satisfied the requirements.

Moreover, utilizing their characteristics, applications of non-aqueous electrolyte batteries, especially Li-ion batteries, have recently been broadened to middle-size and large-size batteries for power tools, electric automobiles, hybrid automobiles, etc., as well as mobile applications such as mobile telephones. As a consequence, demand for higher battery reliability has been on the rise, along with demand for increased capacity and higher output power.

In order to improve the reliability of lithium-ion batteries, a polyolefin-based porous film has been used as a separator interposed between the positive and negative electrodes. In this case, a separator shutdown function operates when the battery temperature abnormally rises, so the battery reliability can be improved.

Nevertheless, even in the case of using a polyolefin-based separator, if the battery temperature greatly rises above the melting point of the polyolefin, the separator shrinks so that the positive and negative electrode active material layers can come into contact with each other, causing short circuiting. As a consequence, a large current flows through the portion where the short circuiting has occurred, and therefore, the temperature rises locally, causing a thermal decomposition reaction between the positive electrode active material and the electrolyte solution. In view of these problems, the key factors for improving the reliability of lithium-ion batteries are such technologies as improving thermal stability of the positive electrode active material, making the electrolyte solution inflammable, and preventing separator shrinkage.

Polyolefin-based porous films that are widely used for the separator in a lithium-ion battery melt and shrink at a low temperature about 120° C. to 160° C. when the battery temperature rises. Taking this into consideration, improving separator reliability is believed to be most effective among the above-mentioned technologies to improve the reliability of the battery. In this case, it is necessary to prevent separator shrinkage even at high temperatures while maintaining the separator's shutdown function. One of such technologies is described in Japanese Unexamined Patent Publication No. 10-50287, which discloses a technique of stacking a heat-resistant microporous film over a surface of the separator in order to prevent shrinkage of the separator at high temperatures and thereby improve battery reliability.

However, when the battery temperature rises above the melting point of the polyolefin-based separator, the positive electrode active material of the non-aqueous electrolyte secondary battery reacts with the electrolyte solution in a charged state or the positive electrode active material itself undergoes thermal decomposition and generates oxygen, so the interior of the battery is brought into a very instable condition. As a consequence, even when the separator shrinkage at high temperatures is prevented by stacking a heat-resistant microporous film over a surface of the separator, battery reliability cannot be ensured sufficiently as long as the potential of the positive electrode is kept high. For this reason, there is a demand for technology to quickly lower the potential of the positive electrode while preventing separator shrinkage at high temperatures.

BRIEF SUMMARY OF THE INVENTION

Accordingly, it is an object of the present invention to provide a non-aqueous electrolyte secondary battery that is capable of remarkably improving battery reliability by quickly lowering the potential of the positive electrode while preventing shrinkage of the separator at high temperatures.

In order to accomplish the foregoing and other objects, the present invention provides a non-aqueous electrolyte secondary battery comprising: a positive electrode comprising a positive electrode active material layer containing a positive electrode active material and a positive electrode current collector made of a conductive metal foil, the positive electrode active material layer disposed on a surface of the positive electrode current collector; a negative electrode comprising a negative electrode active material layer containing a negative electrode active material and a negative electrode current collector made of a conductive metal foil, the negative electrode active material layer disposed on a surface of the negative electrode current collector; a separator made primarily of an olefin-based polymer, the separator disposed between the positive and negative electrodes; the positive electrode and the negative electrode being disposed facing each other with the separator interposed therebetween; a non-aqueous electrolyte; a positive electrode current collector tab attached to the positive electrode current collector; and a negative electrode current collector tab attached to the negative electrode current collector, wherein the separator has, on a surface thereof, a shrinkage-prevention-layer formed portion, on which a layer for preventing separator shrinkage is formed, and a shrinkage-prevention-layer unformed portion, on which the layer for preventing separator shrinkage is not formed; the positive electrode current collector is provided with, on a portion of a surface thereof, a positive electrode current collector exposed portion, on which the positive electrode active material layer is not formed, and the negative electrode current collector is provided with, on a portion of a surface thereof, a negative electrode current collector exposed portion, on which the negative electrode active material layer is not formed, the positive and negative electrode current collector exposed portions being disposed facing each other; and the shrinkage-prevention-layer unformed portion of the separator is disposed at a region at which the positive and negative electrode current collector exposed portions face each other.

The present invention may remarkably improve reliability of the non-aqueous electrolyte secondary battery by quickly lowering the potential of the positive electrode while preventing the separator shrinkage at high temperatures.

DETAILED DESCRIPTION OF THE INVENTION

In the present invention, the positive and negative electrode current collector exposed portions are disposed facing each other, and the shrinkage-prevention-layer unformed portion of the separator is disposed at a region on the separator where the positive and negative electrode current collector exposed portions face each other, as described above. In other words, the shrinkage-prevention-layer formed portion exists at a region on the separator surface where the positive electrode active material layer and the negative electrode active material layer face each other. As a result, when the battery temperature rises, the portion of the separator that is at the region where the positive electrode active material layer and the negative electrode active material layer face each other is prevented from shrinking, and therefore, the positive electrode active material and the negative electrode active material are prevented from being brought into direct contact with each other. On the other hand, the portion of the separator that is at the region where the two current collector exposed portions face each other shrinks, and therefore, the positive electrode current collector exposed portion and the negative electrode current collector exposed portion are brought into contact with each other. Thus, the local temperature increase that is due to the contacting of the positive and negative electrode active materials is prevented, and at the same time, the potential of the positive electrode can be lowered smoothly by bringing the positive and negative electrode current collector exposed portions into contact with each other. Accordingly, a non-aqueous electrolyte secondary battery that shows high reliability even at high temperatures can be obtained because even when the battery temperature further rises, generation of oxygen from the positive electrode active material is prevented as long as the potential of the positive electrode is kept low.

It is desirable that the shrinkage prevention layer be a porous layer comprising an inorganic compound. It is more desirable that the inorganic compound include inorganic microparticles of at least one substance consisting of alumina, titania, and magnesia.

When the shrinkage prevention layer is a porous layer comprising an inorganic compound, the layer for preventing separator shrinkage can be formed easily. The reason why the desirable inorganic compound is restricted to alumina, titania, and magnesia is that these substances show good stability in the battery (low reactivity with lithium) and moreover are available at low cost. When using titania, it is preferable to use a rutile-type titania. The reason is as follows; the anatase-type titania is capable of insertion and deinsertion of lithium ions, and therefore it can absorb lithium and exhibit electron conductivity depending on the surrounding atmosphere and/or the potential, so there is a risk of capacity degradation and short circuiting.

That said, zirconia or the like may also be used as the inorganic compound other than the above-mentioned substances since the type of the inorganic compound has very small influence on the advantageous effects of the invention.

The shrinkage prevention layer can also be a porous layer comprising an organic compound. It is particularly desirable that the organic compound comprise at least one substance selected from the group consisting of polyamide, polyimide, and polyamideimide.

When the shrinkage prevention layer is a porous layer comprising an organic compound, the layer for preventing separator shrinkage can be formed easily as well. It should be noted that polyethylene or the like may be used as the organic compound, other than the above-mentioned substances, since the type of the organic compound has very small influence on the advantageous effects of the invention as in the case of the inorganic compound.

It is desirable that the positive electrode current collector exposed portion be provided at a region of the positive electrode at which the positive electrode current collector tab is attached, and the negative electrode current collector exposed portion be provided at a region of the negative electrode at which the negative electrode current collector tab is attached.

In ordinary batteries, each of the current collector tabs (especially the positive electrode current collector tab) is attached to a region where the active material layers is absent so the current collection effect can be maximized. This means that, if the current collector exposed portions are provided separately at different regions from the regions where the current collector tabs are attached, the coating areas of the positive and negative electrode active materials decrease, resulting in a lower battery capacity. Therefore, it is desirable to employ the above-described configuration.

It is desirable that the ratio of the area of the positive electrode current collector exposed portion to the total area of the positive electrode current collector, the ratio of the area of the negative electrode current collector exposed portion to the total area of the negative electrode current collector, and the ratio of the area of the shrinkage-prevention-layer unformed portion to the total area of the separator each be from 1% to 15%.

The reason is as follows. When each of these ratios exceeds 15%, the amount of each active material applied is too small, resulting in a lower battery capacity. On the other hand, if each of these ratios is less than 1%, the positive electrode current collector exposed portion and the negative electrode current collector exposed portion may not be brought into contact with each other smoothly when the battery temperature rises.

Examples

Hereinbelow, the present invention is described in further detail based on certain embodiments and examples thereof. It should be understood, however, that the present invention is not limited to the following embodiments and examples, but various changes and modifications are possible without departing from the scope of the invention.

Preparation of Positive Electrode

Figure 2:
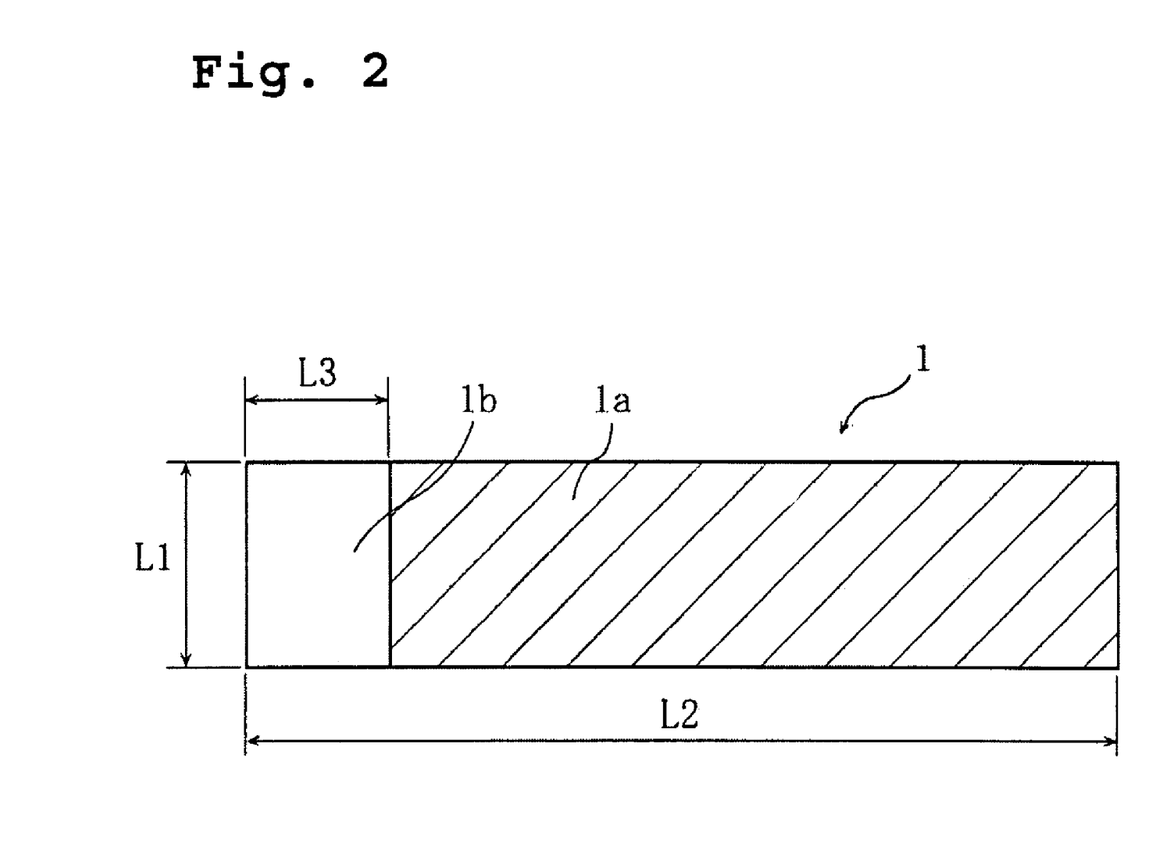
FIG. 2 is a front view illustrating a positive electrode used for the battery of the invention.

First, lithium cobalt oxide (in which 1.0 mol. % of Al and 1.0 mol. % of Mg are contained in the form of a solid solution and 0.05 mol. % of Zr is firmly adhered to the surface) as a positive electrode active material, acetylene black as a carbon conductive agent, and PVDF (poly (vinylidenefluoride)) as a binder agent were mixed together at a mass ratio of 95:2.5:2.5. Thereafter, the mixture was agitated together with NMP (N-methylpyrrolidone) as a solvent, using a Combimix mixer made by Tokushu Kika, to thus prepare a positive electrode active material slurry. Next, the resultant positive electrode active material slurry was applied onto both sides of a positive electrode current collector made of a sheet-like aluminum foil, and the resultant material was then dried and pressure-rolled, whereby a positive electrode active material layer was formed on each of the surfaces of the aluminum foil. It should be noted that when the positive electrode active material slurry was applied onto both sides of the positive electrode current collector, the positive electrode active material slurry was not applied to one end portion of the positive electrode current collector and the vicinity thereof. Thereby, as illustrated in FIG. 2, a positive electrode 1 was prepared that had a positive electrode current collector exposed portion 1b and a positive-electrode-active-material-layer formed portion 1a on which the positive electrode active material layer was formed. The width L1 of the positive electrode 1 was 56 mm, the length L2 was 700 mm, and the length L3 of the positive electrode current collector exposed portion 1b was 60 mm. In addition, a positive electrode current collector tab (not shown) for connecting with a lead terminal was attached to the positive electrode current collector exposed portion 1b.

Preparation of Negative Electrode

Figure 4:
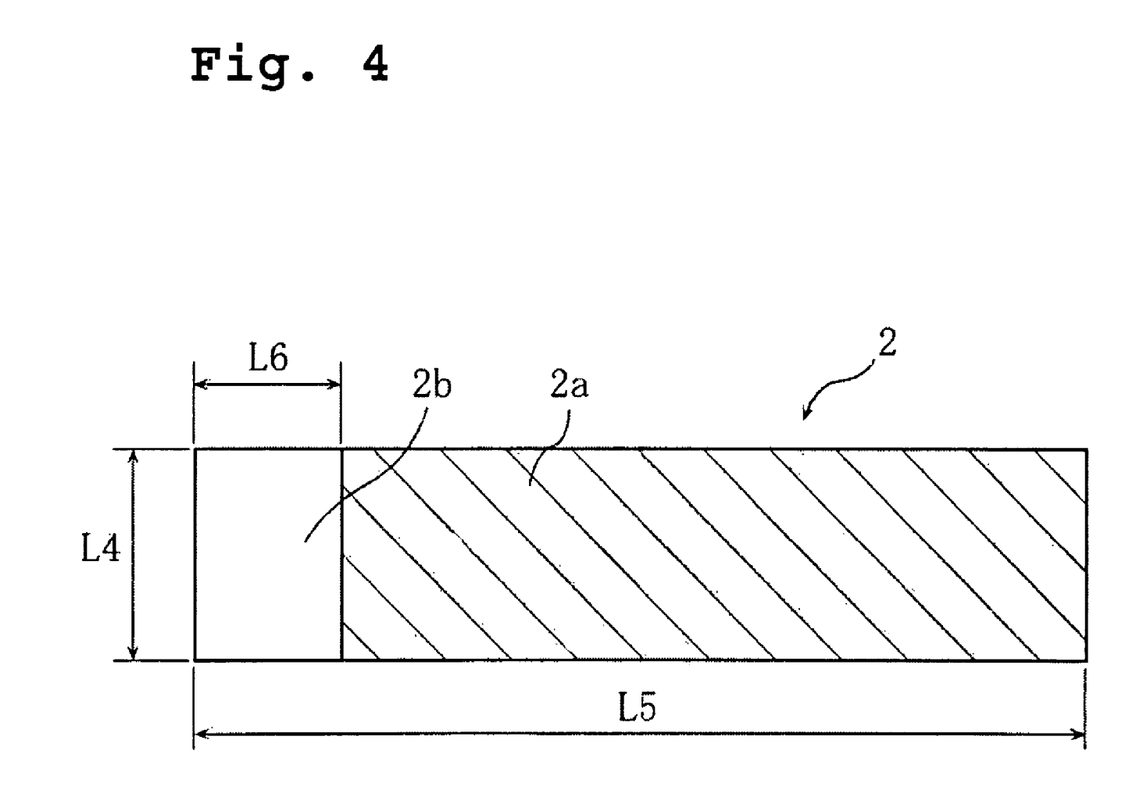
FIG. 4 is a front view illustrating a negative electrode used for the battery of the invention.

A carbonaceous material (artificial graphite), CMC (carboxymethylcellulose sodium), and SBR (styrene-butadiene rubber) were mixed in an aqueous solution at a mass ratio of 98:1:1 to prepare a negative electrode slurry. Thereafter, the negative electrode active material slurry was applied onto both sides of a negative electrode current collector made of a copper foil, and the resultant material was then dried and pressure-rolled. Thus, a negative electrode was prepared. It should be noted that when the negative electrode active material slurry was applied onto both sides of the negative electrode current collector, the negative electrode active material slurry was not applied to one end portion of the negative electrode current collector and the vicinity thereof. Thereby, as illustrated in FIG. 4, a negative electrode 2 was prepared that had a negative electrode current collector exposed portion 2b and a negative-electrode-active-material-layer formed portion 2a on which the negative electrode active material layer was formed. The width L4 of the negative electrode 2 was 58 mm, the length L5 was 740 mm, and the length L6 of the negative electrode current collector exposed portion 2b was 90 mm. In addition, a negative electrode current collector tab (not shown) for connecting with a lead terminal was attached to the negative electrode current collector exposed portion 2b.

Preparation of Non-aqueous Electrolyte Solution

A lithium salt composed of $LiPF_6$ was dissolved at a concentration of 1.0 mole/L in a mixed solvent of 3:7 volume ratio of ethylene carbonate (EC) and diethyl carbonate (DEC) to prepare a non-aqueous electrolyte solution.

Preparation of Separator

Figure 3:
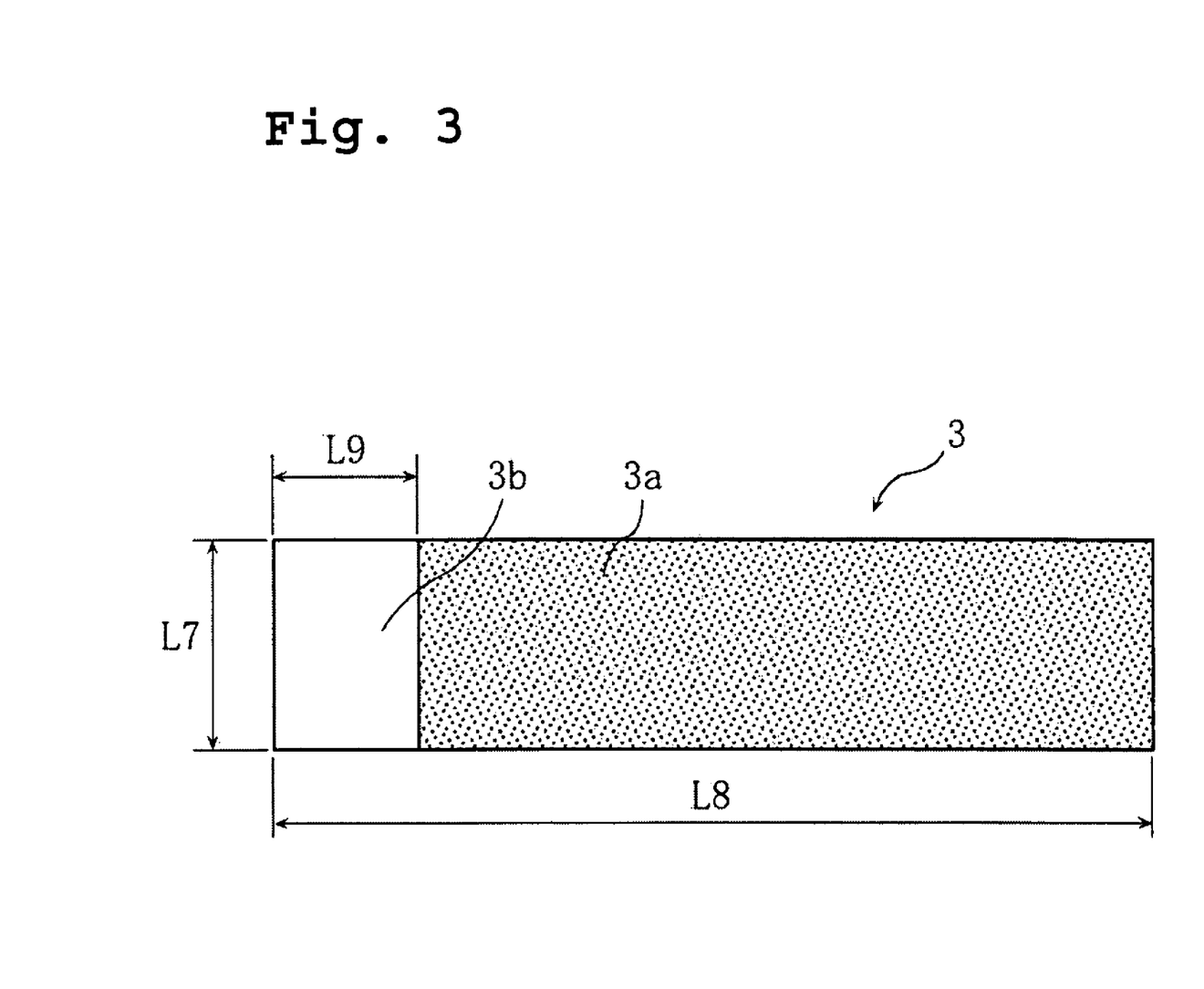
FIG. 3 is a front view illustrating a separator used for the battery of the invention.

First, using water as the solvent, 40 mass % solid content concentration of an oxide $TiO_2$ (rutile-type, particle size 0.38 μm, KR380 manufactured by Titan Kogyo Kabushiki Kaisha) was mixed with 5 mass %, based on the mass of $TiO_2$, of a copolymer (elastic polymer) containing acrylonitrile structures (acrylonitrile units), and a mixing and dispersing process was carried out using a spin mixer Filmics made by Tokushu Kika Kogyo Kabushiki Kaisha. Thus, a $TiO_2$ dispersion slurry was prepared. Next, the resultant slurry was applied onto the surfaces of a polyolefin separator (thickness 16 μm) by gravure coating, and thereafter the solvent was removed by drying. Thus, an inorganic particle layer (i.e., a shrinkage prevention layer for preventing separator shrinkage) with a thickness of about 2 μm was formed on the surfaces of the separator. In this process, using an intermittent coating technique, a portion in which the $TiO_2$ dispersion slurry was not applied was provided at an end portion of the separator. Thereby, as illustrated in FIG. 3, a separator 3 was prepared that had a shrinkage-prevention-layer formed portion 3a, on which the inorganic particle layer was formed, and a shrinkage-prevention-layer unformed portion 3b, on which the inorganic particle layer was not formed. The width L7 of the separator 3 was 60 mm, the length L8 was 800 mm, and the length L9 of the shrinkage-prevention-layer unformed portion 3b was 100 mm.

Construction of Cylindrical Battery

First, the positive and negative electrodes and the separator prepared in the foregoing manner were spirally wound a multiple number of times so that the positive electrode active material layer and the negative electrode active material layer face each other with the separator interposed therebetween, to prepare an electrode assembly. In this process, the shrinkage-prevention-layer unformed portion 3b of the separator was disposed at a region corresponding to the positive electrode current collector exposed portion 1b and the negative electrode current collector exposed portion 2b and where these current collector exposed portions 1b and 2b face each other. Next, this electrode assembly was placed into a battery can, and the negative electrode current collector tab was joined to a bottom portion of the battery can by spot welding while the positive electrode current collector tab was joined to a bottom portion of a battery lid in a similar manner. Finally, the non-aqueous electrolyte solution was filled in the battery can, and thereafter the battery can was sealed. Thus, a cylindrical battery was fabricated. This battery had a design capacity of 2500 mAh.

Figure 1:
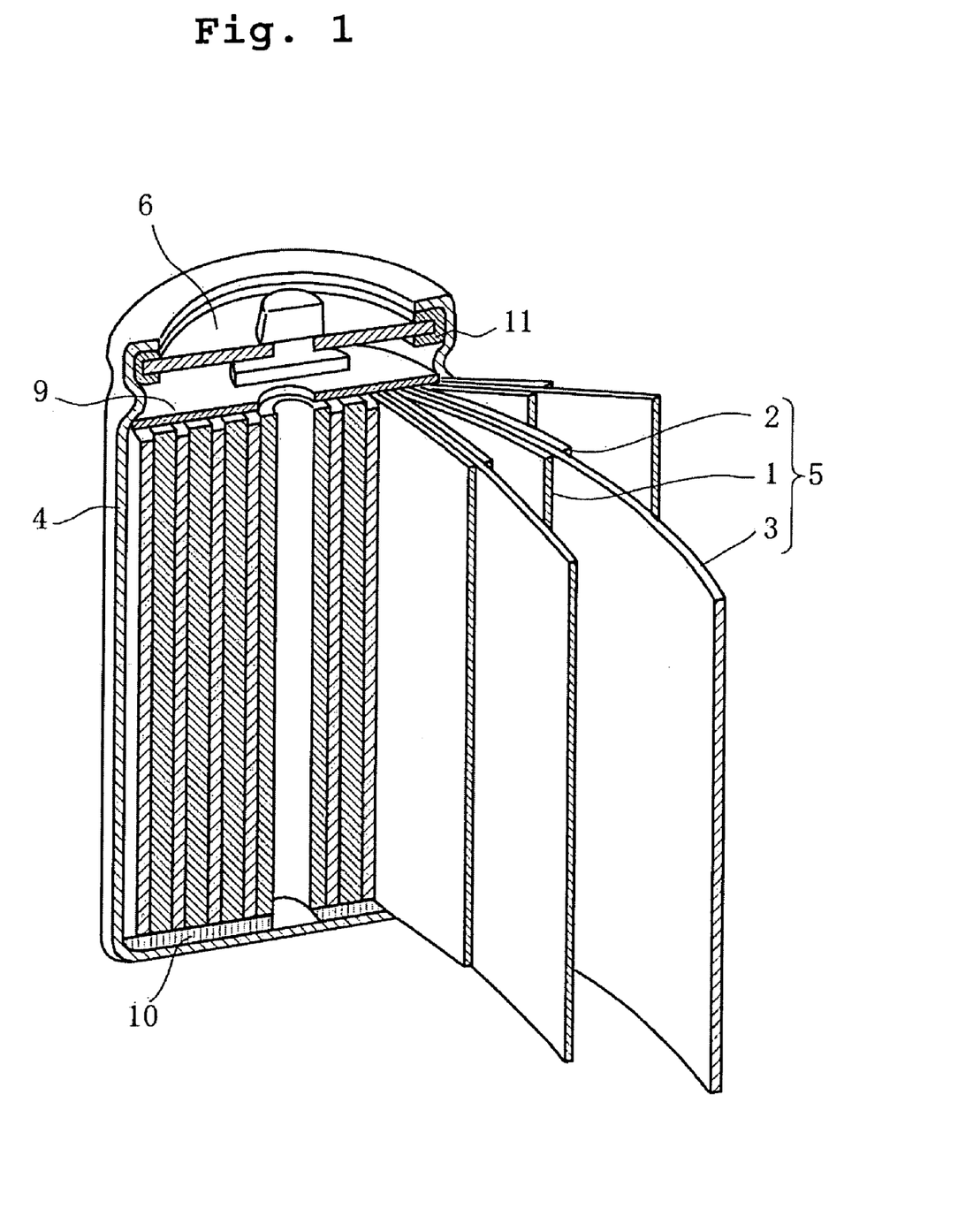
FIG. 1 is a cross-sectional view illustrating a battery of the invention.

The specific construction of the cylindrical lithium secondary battery is as follows. As illustrated in FIG. 1, the battery has: a closed-bottom cylindrical metal battery can 4 having an opening at its top end; the electrode assembly 5 in which the positive electrode 1 and the negative electrode 2 are spirally wound so as to face each other with the separator 3 interposed therebetween; the non-aqueous electrolyte solution impregnated in the electrode assembly 5; and a sealing lid 6 for sealing the opening of the metal battery can 4. The sealing lid 6 serves as a positive electrode terminal, while the metal battery can 4 serves as a negative electrode terminal. The positive electrode current collector tab (not shown), which is attached to the upper side of the electrode assembly 5, is connected to the sealing lid 6, and the negative electrode current collector tab (not shown), which is attached to the lower side of the electrode assembly 5, is connected to the metal battery can 4, whereby a structure that enables charging and discharging as a secondary battery is formed. The upper and lower faces of the electrode assembly 5 are covered with an upper insulating plate 9 and a lower insulating plate 10, respectively, for insulating the electrode assembly 5 from the metal battery can 4 and so forth. The sealing lid 6 is fixed to the opening of the metal battery can 4 by crimping it with an insulative packing 11 interposed therebetween.

EXAMPLES

Example A

A non-aqueous electrolyte secondary battery prepared in the manner described in the foregoing preferred embodiment was used for Example A1.

The battery fabricated in this manner is hereinafter referred to as Battery A of the invention.

Comparative Example 1

A battery was fabricated in the same manner as described in Example A above, except that no inorganic particle layer was provided on the separator (i.e., the separator had no shrinkage-prevention-layer formed portion 3a).

The battery fabricated in this manner is hereinafter referred to as Comparative Battery Z1.

Comparative Example 2

A battery was fabricated in the same manner as described in Example A above, except that the inorganic particle layer was provided over the entire surface of the separator (i.e., the separator had no shrinkage-prevention-layer unformed portion 3b).

The battery fabricated in this manner is hereinafter referred to as Comparative Battery Z2.

Experiment

Precondition in the Following Experiment

Usually, a battery is provided with a protection circuit or a protective device such as a PTC (positive temperature coefficient) device so that the safety of the battery can be ensured even in abnormal conditions. In addition, various safety mechanisms, such as various means for enhancing reliability of the positive and negative electrode materials and additives to the electrolyte solution, are employed so that sufficient safety can be ensured even without the protection circuit and so forth.

In the present test, all the safety materials/mechanisms were eliminated except for the separator shutdown mechanism for the purpose of verifying the improvement in safety as the result of the advantageous effects of the invention, and the battery behavior in the following thermal test was studied.

Experiment Conditions

Each of the batteries was charged at a current of 1.0 It, and further charged at a constant voltage of 4.2 V to a charged state. The temperature of each battery in this condition was elevated from 25° C. to 160° C. at a temperature elevation rate of 5° C./min. in an electric furnace and was then kept at 160° C. for 30 minutes, and at this stage, the battery voltage and the battery temperature were measured for each battery. The results are shown in Table 1. In Table 1, when the battery temperature rose above the temperature kept in the thermal test, i.e., 160° C. or higher, it was determined that the battery reached an abnormal battery temperature.

TABLE 1

| Battery | Time until battery voltage lowered to 1 V or below (sec.) | Number of samples that reached abnormal temperature |
| --- | --- | --- |
| A | 2,060 | 0/5 |
| Z1 | 1,970 | 5/5 |
| Z2 | 2,310 | 3/5 |

As clearly seen from Table 1, in Comparative Battery Z1, the battery voltage lowered to 1 V or lower at 1,970 seconds after the start of the temperature elevation, and all the samples of the battery reached an abnormal battery temperature. In Comparative Battery Z2, the battery voltage did not lower to 1 V or below until 2,310 seconds after the start of the temperature elevation, but 3 out of 5 samples of the battery reached an abnormal battery temperature. In contrast, in Battery A of the invention, although the battery voltage lowered to 1 V or below at 2,060 seconds after the start of the temperature elevation, none of the samples of the battery reached an abnormal battery temperature. This is believed to be due to the following reason.

In Comparative Battery Z1, the separator does not have the shrinkage-prevention-layer formed portion thereon. Therefore, it is believed that in Comparative Battery Z1, the separator shrank more quickly than in Comparative Battery Z2, in which the shrinkage-prevention-layer formed portion was provided over the entire surface of the separator, and in Battery A of the invention, in which the shrinkage-prevention-layer formed portion was present on a large portion of the separator. Consequently, short circuiting occurred between the positive and negative electrodes (the time until the battery voltage lowers to 1 V or below was shorter). Furthermore, it is believed that all the sample batteries of the Comparative Battery Z1 reached an abnormal battery temperature because the positive electrode active material layer and the negative electrode active material layer were brought into contact with each other at the same time as the separator shrinkage.

In Comparative Battery Z2, it is believed that shrinkage of the entire separator was prevented because the shrinkage-prevention-layer formed portion was present on the entire surface of the separator, and as a result, short circuiting between the positive and negative electrodes was prevented (the time until the battery voltage lowered to 1 V or below was very long). Nevertheless, 3 samples of the battery reached an abnormal battery temperature because it is believed that the potential of the positive electrode was kept high for a long time and as a result reaction between the positive electrode and the electrolyte solution accompanying heat generation occurred.

In contrast, in Battery A of the invention, the separator has the shrinkage-prevention-layer unformed portion, which is not subjected to the process for preventing shrinkage. Therefore, the separator shrunk more quickly and the time until short circuiting occurred between the positive and negative electrodes was shorter (the time until the battery voltage lowered to 1 V or below was shorter) than in the case of Comparative Battery Z2, in which the shrinkage prevention layer is present over the entire surface of the separator. In this way, although short circuiting occurred between the positive and negative electrodes more quickly in Battery A of the invention than in Comparative Battery Z2, the short circuiting occurs between the two current collector exposed portions, not between the positive and negative electrode active material layers, because the shrinkage-prevention-layer unformed portion of the separator is disposed at the region corresponding to the two current collector exposed portions. As a result, the potential of the positive electrode can be lowered quickly even when the battery reached a high temperature. Therefore, it is possible to prevent the reaction between the positive electrode and the electrolyte solution that is associated with heat generation.

From the foregoing results, it will be appreciated that a non-aqueous electrolyte secondary battery that shows high reliability even at high temperatures can be provided by employing a battery structure as in Battery A of the invention, in which a shrinkage prevention layer for preventing separator shrinkage is provided on a large portion of the surface of the separator, the shrinkage prevention layer is not formed on a portion of the surface of the separator, and moreover the shrinkage-prevention-layer unformed portion is disposed at a region corresponding to the two current collector exposed portions.

Other Embodiments (1) Although the foregoing example used a porous layer comprising an inorganic compound as the separator shrinkage prevention layer, this configuration is not restrictive of the invention, and the same advantageous effects may be obtained with the use of a porous layer comprising an organic compound.

(2) In the present experiment, the shrinkage-prevention-layer unformed portion of the separator, the positive electrode current collector exposed portion, and the negative electrode current collector exposed portion are disposed at a terminal end portion of the coiled electrode assembly, but they may be arranged at any regions suitable for the battery type and the battery construction. For example, the shrinkage-prevention-layer unformed portion of the separator and the current collector exposed portions may be disposed at a mid portion of the electrode assembly or at a starting end of the coiled electrode assembly. Moreover, both the current collector exposed portions are not necessarily disposed at the region where the current collector tabs are attached, and they may be disposed at a region separate from the region where the current collector tabs are attached.

(3) The positive electrode active material is not limited to lithium cobalt oxide. Other usable materials include lithium composite oxides containing cobalt or manganese, such as lithium cobalt-nickel-manganese composite oxide, lithium aluminum-nickel-manganese composite oxide, and lithium aluminum-nickel-cobalt composite oxide, as well as spinel-type lithium manganese oxides. Preferably, the positive electrode active material shows a capacity increase by being charged at a higher voltage than 4.3 V verses the potential of a lithium reference electrode, and preferably has a layered structure. Moreover, such positive electrode active materials may be used either alone or in combination with other positive electrode active materials.

(4) The method for mixing the positive electrode active material is not limited to wet-type mixing techniques, and it is possible to employ a method in which a positive electrode active material and a conductive agent are dry-blended in advance, and thereafter PVDF and NMP are mixed and agitated together.

(5) The negative electrode active material is not limited to graphite as described above. Various other materials may be employed, such as coke, tin oxides, metallic lithium, silicon, and mixtures thereof, as long as the material is capable of intercalating and deintercalating lithium ions.

(6) The lithium salt in the electrolyte solution is not limited to $LiPF_6$, and various other substances may be used, including $LiBF_4$, $LiN(SO_2CF_3)_2$, $LiN(SO_2C_2F_5)_2$, and $LiPF_{6-x}$ ($C_n F_{2n+1}$) X (wherein $1 \leq x \leq 6$ and n=1 or 2), which may be used either alone or in combination. The concentration of the lithium salt is not particularly limited, but it is preferable that the concentration of the lithium salt be restricted in the range of from 0.8 moles to 1.5 moles per 1 liter of the electrolyte solution. The solvents for the electrolyte solution are not particularly limited to ethylene carbonate (EC) and diethyl carbonate (DEC) mentioned above, and preferable solvents include carbonate solvents such as propylene carbonate (PC), γ-butyrolactone (GBL), ethyl methyl carbonate (EMC), and dimethyl carbonate (DMC). More preferable is a combination of a cyclic carbonate and a chain carbonate.

(7) The present invention may be applied not only to liquid-type batteries but also to gelled polymer batteries. In this case, usable examples of the polymer material include polyether-based solid polymer, polycarbonate solid polymer, polyacrylonitrile-based solid polymer, oxetane-based polymer, epoxy-based polymer, and copolymers or cross-linked polymers comprising two or more of these polymers, as well as PVdF. Any of the above examples of polymer material may be used in combination with a lithium salt and an electrolyte to form a gelled solid electrolyte.

(8) Preferable examples of the materials of the binder are not limited to the copolymers containing acrylonitrile units, but may also include PTFE (polytetrafluoroethylene), PVDF (polyvinylidene fluoride), PAN (polyacrylonitrile), SBR (styrene-butadiene rubber), modified substances thereof, derivatives thereof, and derivatives of polyacrylic acids. However, copolymers containing acrylonitrile units and derivatives of polyacrylic acids are preferable in that they exhibit a binder effect with a small amount.

The present invention may be applied not only to the driving power source of mobile information terminals such as portable telephones, notebook computers, or PDAs, but also to large-scale batteries such as the power source for power tools and the in-vehicle power source for electric automobiles and hybrid automobiles.

This application claims priority of Japanese patent application No. 2007-083760 filed Mar. 28, 2007, which is incorporated herein by reference.

What is claimed is:

1. A non-aqueous electrolyte secondary battery comprising: a positive electrode comprising a positive electrode active material layer containing a positive electrode active material and a positive electrode current collector made of a conductive metal foil, the positive electrode active material layer being disposed on a surface of the positive electrode current collector; a negative electrode comprising a negative electrode active material layer containing a negative electrode active material and a negative electrode current collector made of conductive metal foil, the negative electrode active material layer being disposed on a surface of the negative electrode current collector; a separator made primarily of an olefin-based polymer, the separator being disposed between the positive and negative electrodes; the positive electrode active material layer and the negative electrode active material layer being disposed facing each other with the separator interposed therebetween; a non-aqueous electrolyte; a positive electrode current collector tab attached to the positive electrode current collector; and a negative electrode current collector tab attached to the negative electrode current collector, wherein the separator has on a surface thereof a shrinkage-prevention-layer formed portion, on which a layer for preventing separator shrinkage is formed, and a shrinkage-prevention-layer unformed portion, on which the layer for preventing separator shrinkage is not formed, the shrinkage prevention layer being a porous layer comprising an inorganic compound; the positive electrode current collector is provided with, on a portion of a surface thereof, a positive electrode current collector exposed portion, on which the positive electrode active material layer is not formed, and the negative electrode current collector is provided with, on a portion of a surface thereof, a negative electrode current collector exposed portion, on which the negative electrode active material layer is not formed, the positive and negative electrode current collector exposed portions being disposed facing each other; the shrinkage-prevention-layer formed portion being disposed at a region where the positive electrode active material layer and the negative electrode active material layer face each other; and the shrinkage-prevention-layer unformed portion of the separator being disposed at a region at which the positive and negative electrode current collector exposed portions face each other, wherein the percentage ratio of the area of the positive electrode current collector exposed portion to the total area of the positive electrode current collector, the percentage ratio of the area of the negative electrode current collector exposed portion to the total area of the negative electrode current collector, and the percentage ratio of the area of the shrinkage-prevention-layer unformed portion to the total area of the separator are each from 1% to 15%.

2. The non-aqueous electrolyte secondary battery according to claim 1, wherein the inorganic compound includes inorganic microparticles of at least one substance consisting of alumina, titania, and magnesia.

3. The non-aqueous electrolyte secondary battery according to claim 1, wherein the positive electrode current collector exposed portion is provided at a region of the positive electrode at which the positive electrode current collector tab is attached, and the negative electrode current collector exposed portion is provided at a region of the negative electrode at which the negative electrode current collector tab is attached.

4. The non-aqueous electrolyte secondary battery according to claim 2, wherein the positive electrode current collector exposed portion is provided at a region of the positive electrode at which the positive electrode current collector tab is attached, and the negative electrode current collector exposed portion is provided at a region of the negative electrode at which the negative electrode current collector tab is attached.

5. The non-aqueous electrolyte secondary battery according to claim 1, wherein the shrinkage-prevention-layer formed portion is formed on the surface of the separator.

6. The non-aqueous electrolyte secondary battery according to claim 2, wherein the shrinkage-prevention-layer formed portion is formed on the surface of the separator.

7. The non-aqueous electrolyte secondary battery according to claim 3, wherein the shrinkage-prevention-layer formed portion is formed on the surface of the separator.

8. A non-aqueous electrolyte secondary battery comprising: a positive electrode comprising a positive electrode active material layer containing a positive electrode active material and a positive electrode current collector made of a conductive metal foil, the positive electrode active material layer being disposed on a surface of the positive electrode current collector; a negative electrode comprising a negative electrode active material layer containing a negative electrode active material and a negative electrode current collector made of a conductive metal foil, the negative electrode active material layer being disposed on a surface of the negative electrode current collector; a separator made primarily of an olefin-based polymer, the separator being disposed between the positive and negative electrodes; the positive electrode active material layer and the negative electrode active material layer being disposed facing each other with the separator interposed therebetween; a non-aqueous electrolyte; a positive electrode current collector tab attached to the positive electrode current collector; and a negative electrode current collector tab attached to the negative electrode current collector, wherein, prior to assembly of the battery; (1) the separator has on a surface thereof a shrinkage-prevention-layer formed portion, on which a layer for preventing separator shrinkage is disposed, and a shrinkage-prevention-layer unformed portion, on which the layer for preventing separator shrinkage is not disposed, the shrinkage prevention layer being a porous layer comprising an inorganic compound; (2) the positive electrode current collector is provided with, on a portion of a surface thereof, a positive electrode current collector exposed portion, on which the positive electrode active material layer is not disposed, and (3) the negative electrode current collector is provided with, on a portion of a surface thereof, a negative electrode current collector exposed portion, on which the negative electrode active material layer is not disposed;

wherein, after the battery is assembled: (a) the positive and negative electrode current collector exposed portions are arranged facing each other; (b) the shrinkage-prevention-layer formed portion is arranged at a region where the positive electrode active material layer and the negative electrode active material layer face each other; and (c) the shrinkage-prevention-layer unformed portion of the separator is arranged at a region at which the positive and negative electrode current collector exposed portions face each other, and wherein the percentage ratio of the area of the positive electrode current collector exposed portion to the total area of the positive electrode current collector, the percentage ratio of the area of the negative electrode current collector exposed portion to the total area of the negative electrode current collector, and the percentage ratio of the area of the shrinkage-prevention-layer unformed portion to the total area of the separator are each from 1% to 15%.

* * * * *